R. PAYTON.
PLOW.
APPLICATION FILED APR. 29, 1910.

1,125,165.

Patented Jan. 19, 1915.

2 SHEETS—SHEET 1.

Witnesses:
Jas. E. Hutchinson
S. Jay Teller

Inventor:
Richard Payton
By H. H. Bliss Attorney

R. PAYTON.
PLOW.
APPLICATION FILED APR. 29, 1910.
1,125,165.
Patented Jan. 19, 1915.
2 SHEETS—SHEET 2.
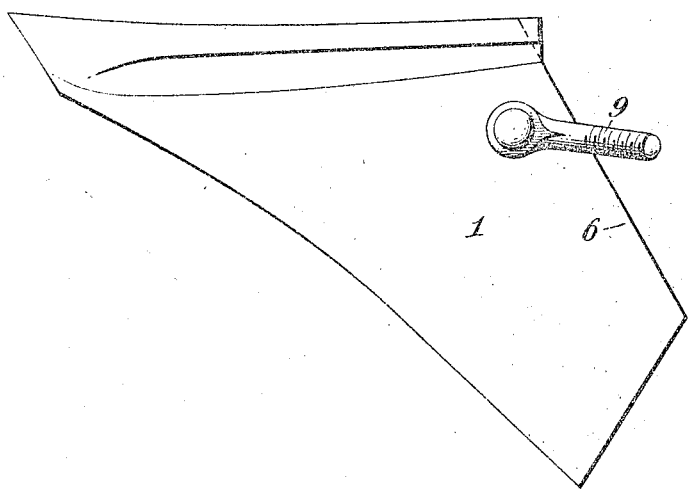
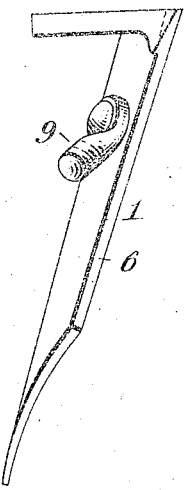
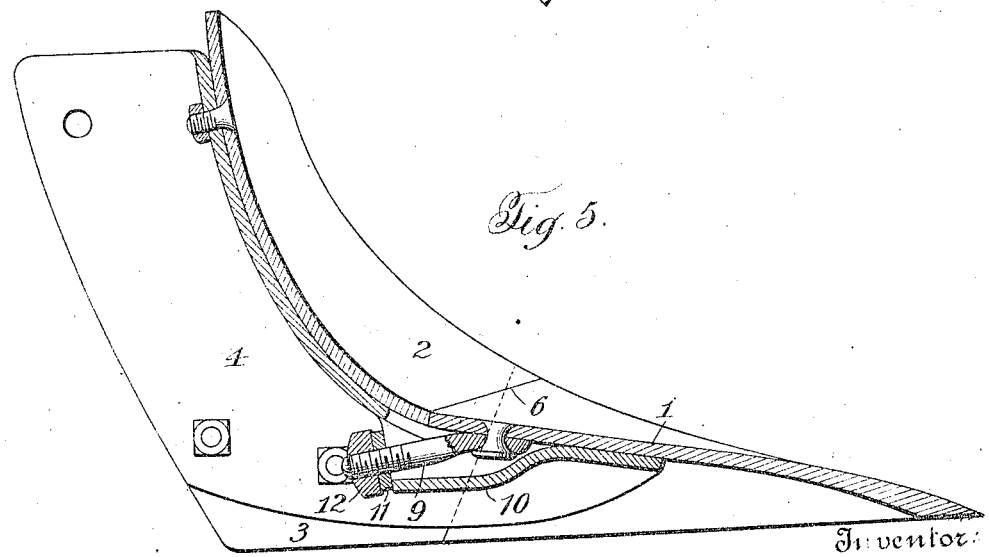
Witnesses:
Jas. E. Hutchinson
S. Jay Teller
Inventor
Richard Payton
By H. H. Bliss Attorney

UNITED STATES PATENT OFFICE.

RICHARD PAYTON, OF MOLINE, ILLINOIS, ASSIGNOR TO DEERE & COMPANY, A CORPORATION OF ILLINOIS.

PLOW.

1,125,165.      Specification of Letters Patent.      Patented Jan. 19, 1915.

Application filed April 29, 1910. Serial No. 558,520.

*To all whom it may concern:*

Be it known that I, RICHARD PAYTON, a citizen of the United States, residing at Moline, in the county of Rock Island and State of Illinois, have invented certain new and useful Improvements in Plows, of which the following is a specification, reference being had therein to the accompanying drawing.

This invention relates to improvements in plow bottoms and is especially adapted for use in steam plows in which a number of bottoms are secured to the same tractor frame.

The object of the invention is to provide a plow bottom in which the point or share may be readily and quickly detached from or attached to the other parts of the plow bottom.

In the accompanying drawings I have shown one embodiment of my invention. It will be understood, however, that various changes may be made in the arrangement of parts and in structural details within the scope of my invention.

Figure 1:
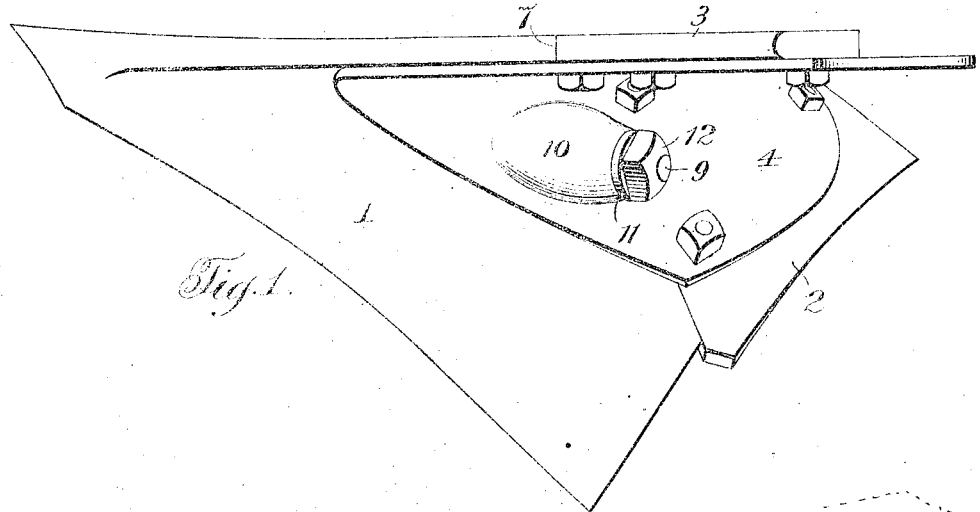
Figure 2:
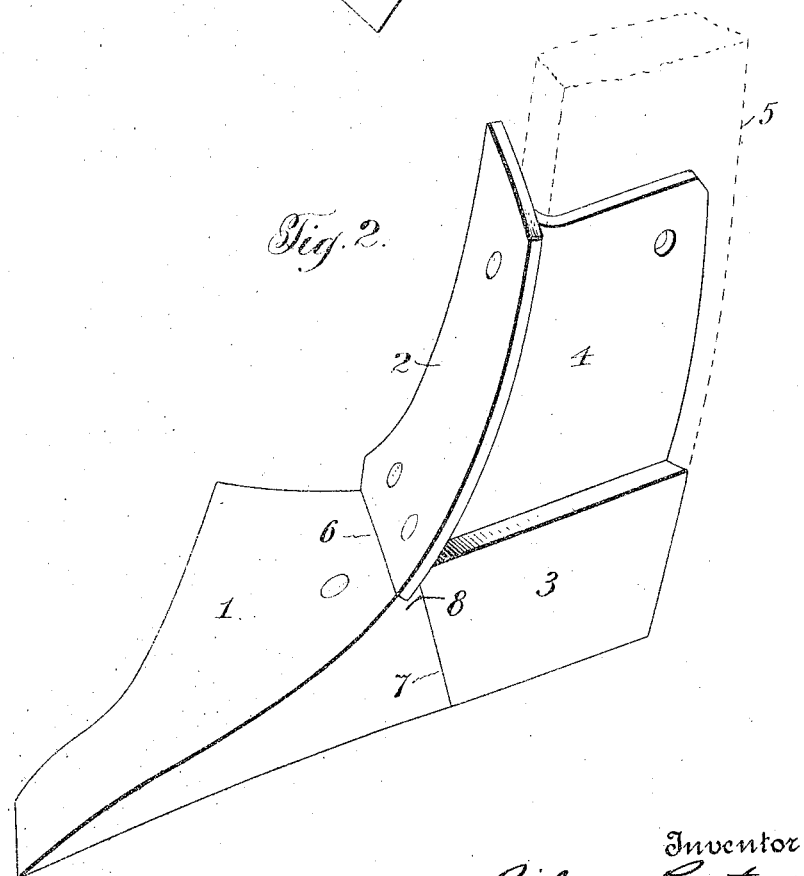

Of the drawings—Figure 1 is a bottom perspective view of a plow embodying my invention. Fig. 2 is a perspective view taken from the front. Fig. 3 is a bottom view of the detachable share detached from the other parts of the plow bottom. Fig. 4 is a perspective view of the share taken from the rear. Fig. 5 is a cross sectional view of the plow taken through the connection for the detachable share.

Referring to the drawings, 1 represents the plow point or share; 2 the mold-board; 3 the land-side; and 4 the frog to which the other parts are attached.

5 is a standard to which the frog is attached and by means of which the plow body is moved.

The frog is bent and forged into suitable shape, and to one part of it is attached the mold-board by means of bolts or rivets. To the other part is rigidly secured the land-side 3, also by suitable bolts or rivets. The mold-board, the frog and the land-side will, for the sake of convenience, be designated as the plow body.

The plow share 1 is formed with one part 6 adapted to aline with the mold-board, and with another part 7 at an angle to the part 6 and adapted to aline with the land-side 3. The parts 6 and 7 each engage with and are supported by the forward end of the frog. The forward side of the share is ground to a sharp edge, and it is for the purpose of resharpening this edge from time to time that the share is made detachable.

It will be noted by a reference to Figs. 2 and 3 that the part of the share 1 which is in alinement with the land-side 3 is extended backward to a point beneath the edge of the mold-board 2, a short ledge 8 being thus formed which is adapted to engage with the underside of the mold-board. This ledge aids in holding the parts in alinement, and its purpose will be more fully set forth hereafter.

9 represents a tension bolt, or equivalent device, which is connected by a rivet, or otherwise, at its forward end to the under side of the moldboard section of the plow share. This bolt extends at a lateral acute angle to the rear edge of the moldboard section of the share and in such a direction that tension on the bolt will tend to slide the share relative to the mold-board to maintain the part 7 in firm engagement with the side of the frog 4. The bolt 9 also lies at a downward acute angle to the plane of the share. Tension on the bolt, therefore, also tends to hold the part 6 of the share in firm engagement, not only with the edge of the mold-board, but also with the upper surface of the frog 4. From the upper or main body part of the frog 4 there is struck down a depending integral casing or housing 10 which forms a socket for the bolt 9, the rear end of which extends through the open rear end of the socket. The bolt is provided preferably with a washer 11 and a nut 12 by means of which the bolt may be tensioned and the share thereby drawn into and maintained in proper position.

It will be noted that the ledge 8 in coöperation with the frog 4 positively maintains the part of the share adjacent the land-side in proper alinement. The bolt 9 holds the other side of the share in close contact with the frog and in alinement with the mold-board, and also prevents any lateral displacement of the share relative to the plow body.

When it is desired to remove the share for the purpose of sharpening or making other repairs, it is only necessary to remove the nut 12 and the washer 11 thus leaving the share entirely free.

The casing or housing 10 covers the forward end of the bolt thus giving a smooth outline and also protecting the bolt from the accumulation of soil which might otherwise collect and prevent the easy replacement of the share after it had once been removed.

What I claim is:—

1. In a plow, the combination of a sheet metal frog having a depending integral housing struck down from the main body and open at the rear, a moldboard secured to the frog, a detachable share adapted to engage the frog and moldboard, a share securing bolt secured to the underside of the share and adapted to extend rearward into and through the housing, and means for engaging the end of the bolt to tension it.

2. In a plow, the combination of a sheet metal frog formed with a moldboard part and a landside part, a moldboard connected to the moldboard part, a detachable share having a moldboard section and a landside section at an angle to each other and adapted to engage respectively with the moldboard part and the landside part of the frog, a bolt connected at its forward end to the under side of the moldboard section of the share at a point remote from the landside section, and a bolt receiving housing integral with the moldboard part of the frog and struck downward therefrom, the housing being open at its side and having an aperture at its rear end through which the rear end of the bolt may project, and a nut for tensioning the bolt by engagement with the rear end of the housing.

3. In a plow, the combination of a frog having a landside part and a moldboard part at an angle to each other, a moldboard connected to the moldboard part of the frog, a detachable share having a moldboard section and a landside section at an angle to each other and adapted to engage respectively with the moldboard part and the landside part of the frog, the moldboard section of the share also engaging at its rear edge with the forward edge of the moldboard, a bolt connected at its forward end to the lower side of the moldboard section of the share at a point remote from the landside section, the said bolt extending at an outward acute angle to the line of contact between the moldboard and the moldboard section of the share, and at a downward acute angle to the plane of the moldboard section of the share, and means engaging with the frog for tensioning said bolt whereby the share is drawn laterally and rearward to force the landside section into firm engagement with the landside part of the frog and the moldboard section into firm engagement with the moldboard, and downward to force the moldboard section into firm engagement with the moldboard part of the frog.

4. In a plow, the combination of a frog having a moldboard part and landside part at an angle to each other, a moldboard secured to the moldboard part of the frog, a detachable share having a moldboard section and a landside section at an angle to each other and adapted to engage respectively with the moldboard part and the landside part of the frog, the said landside section of the share being extended rearward and shaped to engage with the under side of the moldboard, a bolt connected at its forward end to the under part of the moldboard section of the share at a point remote from the landside section, the said bolt extending at an outward acute angle to the line of contact between the moldboard and the moldboard section of the share and at a downward acute angle to the plane of the moldboard section of the share, and means engaging with the frog for tensioning the bolt, whereby the share is drawn laterally and rearward to force the land side section into firm engagement with the land side part of the frog and the moldboard section into firm engagement with the moldboard, and downward to force the moldboard section into firm engagement with the moldboard part of the frog.

5. In a plow, the combination of a sheet metal frog formed with a moldboard part and a landside part, of a moldboard connected to the moldboard part, a detachable share having a moldboard section and a landside section at an angle to each other and adapted to engage respectively with the moldboard part and the landside part of the frog, a bolt connected at its forward end to the under side of the moldboard section of the share at a point remote from the landside section, a bolt receiving housing integral with the moldboard part of the frog and struck downward therefrom, the frog and housing having a continuous substantially smooth and horizontal bottom outline and the housing being provided with an opening in its upper side for receiving the bolt and with an aperture at its rear through which the rear end of the bolt may project, and a nut for tensioning the bolt by engagement with the rear end of the housing.

In testimony whereof I affix my signature, in presence of two witnesses.

RICHARD PAYTON.

Witnesses:
FRED H. COOPER,
EUGENE L. TAYLOR.